United States Patent [19]

Long

[11] Patent Number: 5,049,059
[45] Date of Patent: Sep. 17, 1991

[54] APPARATUS FOR FORMING POLYCARBONATE SHEETING

[75] Inventor: Graham Long, New South Wales, Australia

[73] Assignee: Precision Roofing Accessories Co., Pty., West Ryde, Australia

[21] Appl. No.: 622,834

[22] Filed: Dec. 4, 1990

Related U.S. Application Data

[62] Division of Ser. No. 305,276, Feb. 1, 1989, Pat. No. 4,986,950.

[51] Int. Cl.⁵ .................... B29C 53/04; B29C 53/24
[52] U.S. Cl. .................................. 425/383; 65/287; 72/128
[58] Field of Search .............. 425/383, 384, 396; 65/288-291, 106, 287; 72/128

[56] References Cited

U.S. PATENT DOCUMENTS

| | | | |
|---|---|---|---|
| 2,518,896 | 8/1950 | Jendrisak | 65/106 |
| 3,103,430 | 9/1963 | Jehdrisak | 65/290 |
| 3,116,993 | 1/1964 | Richardson | 65/290 |
| 3,251,672 | 5/1966 | Touvay et al. | 65/291 |
| 3,340,037 | 9/1967 | Stevenson | 65/287 |
| 4,022,045 | 5/1977 | Riha | 72/128 |
| 4,254,649 | 3/1981 | Cervenka et al. | 72/128 |

Primary Examiner—Willard E. Hoag
Attorney, Agent, or Firm—Ladas & Parry

[57] ABSTRACT

The invention relates to an apparatus for forming twin-wall polycarbonate sheets into desired arcuate forms to be used for example for awnings. The apparatus is distinguished from known forming apparatus which are generally not effective in forming the polycarbonate sheets hereinafter described.

The apparatus generally comprises means for preheating a portion of the polycarbonate sheet, engaging the sheet with the mould which is pivotally mounted to the frame of the apparatus, frictionally restraining the movement of the sheet with respect to the frame at a position spaced from the mould, and pivoting the mould so as to form the sheet.

The present invention generally overcomes the difficulties in forming twin-walled polycarbonate sheets thereby allowing the material to be used in place of other conventional awning materials such as fibreglass and corrugated iron.

16 Claims, 4 Drawing Sheets

5,049,059

APPARATUS FOR FORMING POLYCARBONATE SHEETING

This is a divisional of copending application Ser. No. 07/305,276 filed on Feb. 1, 1989, now U.S. Pat. No. 4,986,950.

The present invention relates to the moulding of plastic composite sheets, and in particular to the forming of a polycarbonate sheet into barrel vaults and bull nozes.

Twin walled polycarbonate sheeting which has a plurality of spacing webs between the walls is relatively new in the moulding industry. Due to its lightweight, and excellent light transmission and insulating properties it makes it very useful in the roofing industry, as well as other industries. Until recently the moulding of such materials has not been possible with conventional moulding apparatus due to the temperature differential resulting on the walls and the cracks and bubbles appearing on the surfaces of the moulded sheet. Unfortunately, whereas simply moulding of flat sheets has now been achieved, the moulding of an arcuate configuration, such as a barrel vault or bull noze as commonly known, in the industry has not yet been possible.

It is therefore an object of the present invention to overcome or substantially ameliorate this disadvantage.

In accordance with one broad form of the present invention there is disclosed a method of moulding a polycarbonate sheet into a generally arcuate configuration comprising the steps of heating a predetermined portion of the sheet in a heating chamber to a predetermined temperature prior to forming, and keeping said sheet spaced from a mould member until ready to form, said mould member having a predetermined arcuate mould surface consistent with said arcuate configuration, then bringing said sheet into contact with a leading portion of said mould member and rotating said mould so as to progressively move said sheet through said chamber and form said sheet about said surface.

Preferably said forming taking place in the presence of cooling air and no heat. Further, the progression of said sheet is preferably hindered by a friction clamping means located forward of the mould member.

A second broad form of the present invention provides an apparatus for moulding a polycarbonate sheet into a generally arcuate configuration, comprising a heating chamber, guide means to hold the sheet in a predetermined position spaced from a mould member having a predetermined arcuate mould surface and being pivotably mounted in said chamber, further comprising locating means to bring said sheet into contact with a leading portion of said mould member and means to rotate said mould in a predetermined direction.

Preferably, the mould is manufactured from stainless steel formed to the shape required and filled with polyurethane foam. Also, it is preferable that the heating be by means of incalloy elements above the sheet and/or fast heating quartz elements to the side, and that the apparatus further comprises a friction clamping means frictionally resist the progression of said sheet through said apparatus.

When forming a bull noze (i.e. a quarter circle on the end of a sheet), the heating frame length is preferably approximately 200 mm plus the length of the arc. Similarly, a barrel vault i.e. a semi-circle on the end of a sheet, requires the heating frame length to be approximately 200 mm plus the length of the semi-circle. However, it should be appreciated that these dimensions are determined by the sensitivity of the polycarbonate sheet used and may vary from substance to substance.

BRIEF DESCRIPTION OF THE DRAWINGS

A preferred embodiment of the present invention will now be described, by way of example only, with reference to the accompanying drawings in which.

Figure 1:
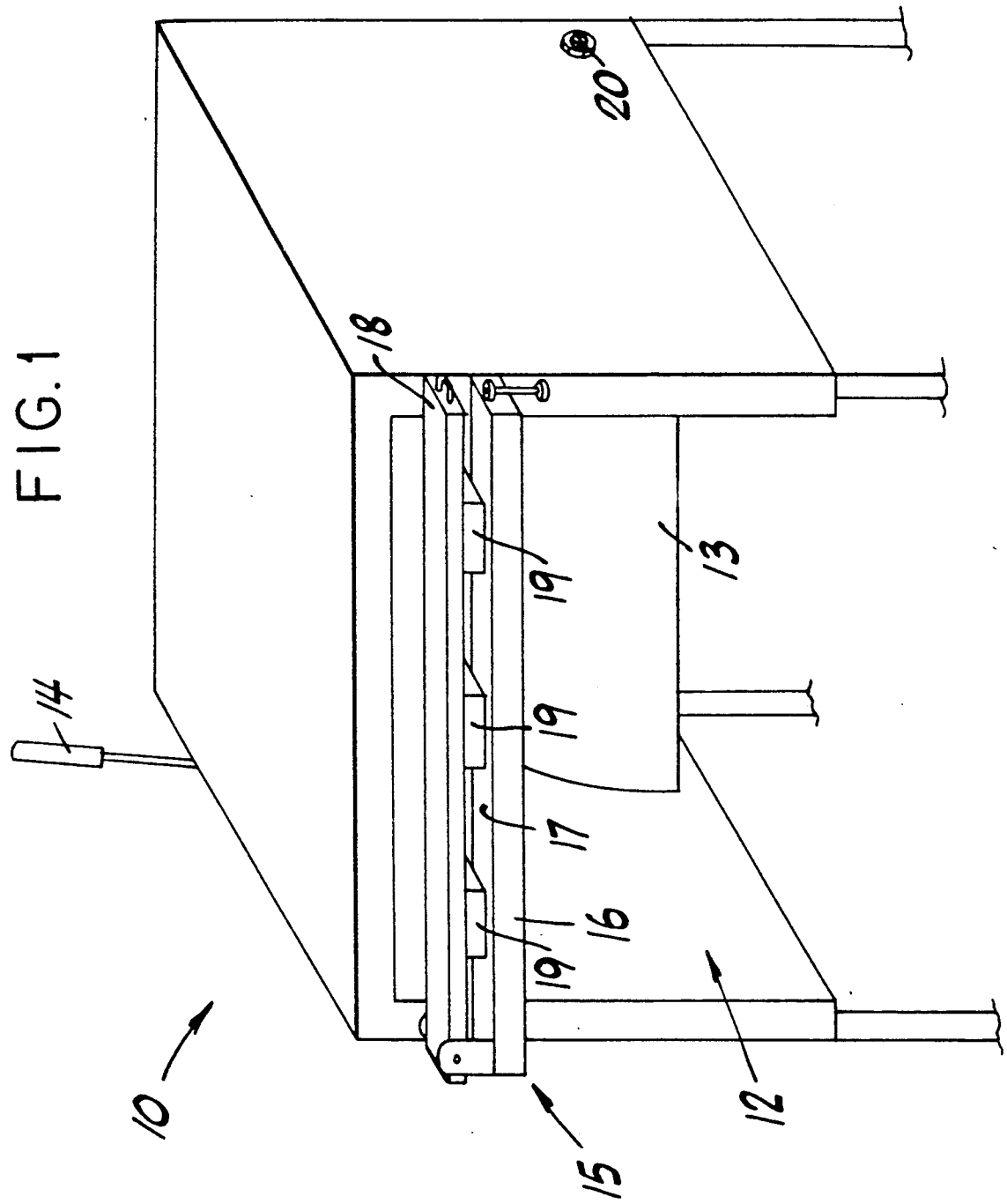
FIG. 1 is a perspective view of one embodiment of the apparatus of the present invention.

There is depicted an apparatus 10 for forming an arcuate section on the end of a polycarbonate sheet 11. The apparatus 10 comprises a heating chamber 12 and a mould 13. The mould 13 is removable from the chamber 12 so that any one of a number of desired moulds can be used in the apparatus. The mould 13 is mounted on an axle 20 so as to be pivotable, with a handle 14 being attached to the axle 20 for manually rotating the mould 13.

The mould 13 comprises a stainless steel outer shell 21 filled with a polyurethane foam 22. The outer shell 21 defines a mould surface 23 which is generally arcuate and consistent with the desired curvature of the sheet 11.

Figure 2:
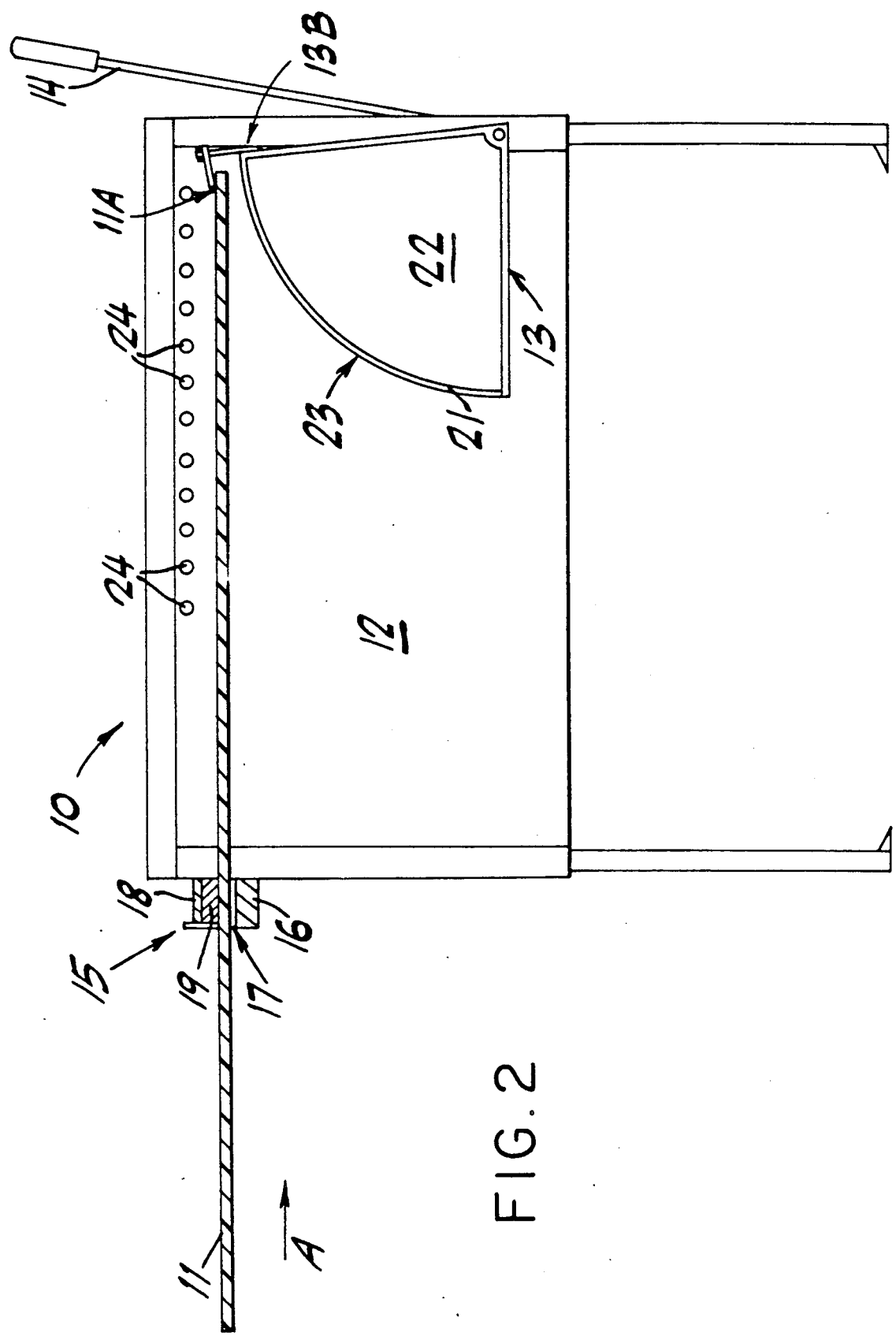
FIG. 2 is a side elevation cross sectional view of the embodiment of FIG. 1.
Figure 3:
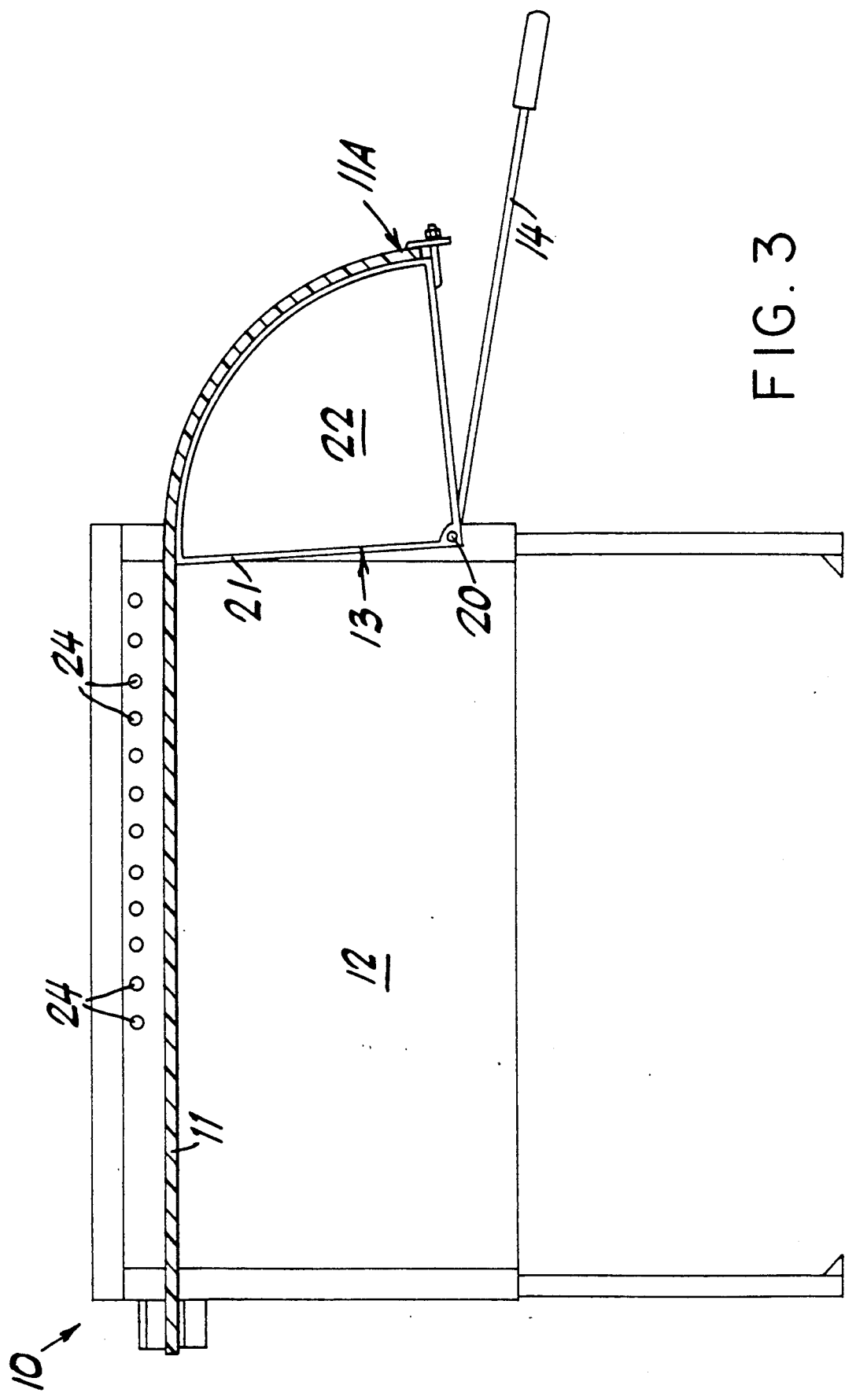
FIG. 3 is a side elevation cross sectional view of the apparatus of FIG. 1 showing the polycarbonate sheet after being formed.
Figure 4:
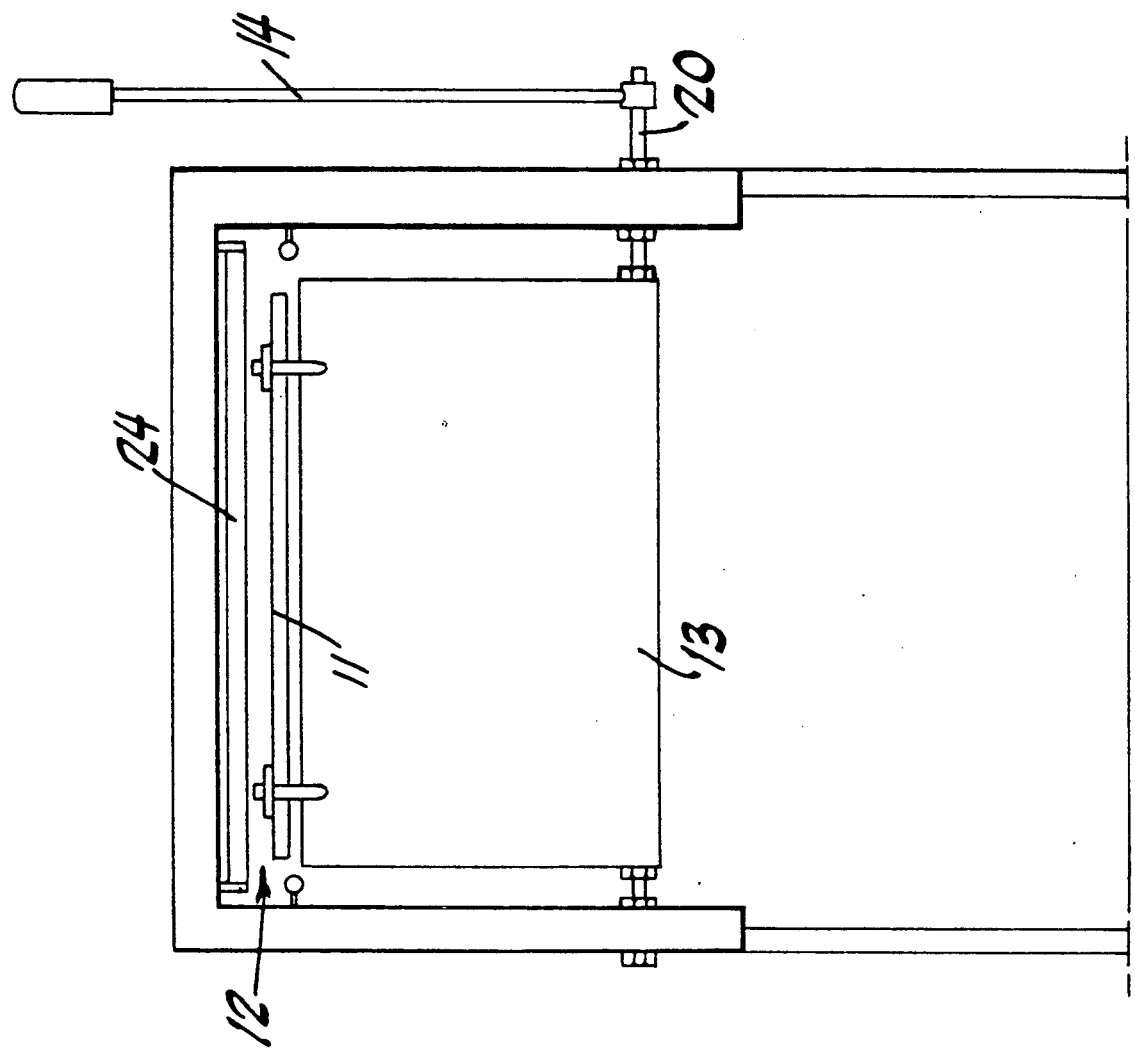
FIG. 4 is an end elevation of the apparatus of FIG. 1.

As best seen in FIGS. 1, 2 and 3, the sheet 11 is fed into the heating apparatus 12 in the direction indicated by arrow A. When a length of the sheet 11 is within the heating chamber 12, a predetermined portion of the sheet 11 is heated to a predetermined temperature suitable for moulding the sheet 11 by means of top incalloy elements and side fast heating quartz elements. The top elements are 1 kW and are arranged in three banks of four, each element being parallel and extending normal to the direction of arrow "A", and are spaced approximately 100 mm. apart.

When the sheet 11 is at the predetermined temperature, the heating elements are turned off and the sheet 11 is then brought into contact with the mould 13 from which it had previously been isolated. The leading edge 11A of the sheet 11 is attached to the leading portion 13B of the the mould 13, and at a position distanced from the leading edge, the sheet 11 is clamped in a clamping means 15 so as to frictionally engage the sheet 11 and create a resistance to movement, by means of a predetermined friction, of the sheet 11 through the apparatus 10.

The clamping means 15 comprises a base frame 16 having a support surface 17. Pivotably mounted to the base frame 16 is an engaging member 18 having a plurality of blocks 19. The engaging member 18 is movable between an open position wherein the sheet 11 can freely pass through the frame 16, and a clamping position wherein said blocks 19 and support surface 17 are caused to exert a predetermined force on the sheet 11. The support surface 17 and the blocks 19 are made from a nylon material having a known friction coefficient whereby the clamping force exerted thereby is predetermined so as to create the desired frictional resistance to movement of the sheet 11. The desired frictional resistance will allow the sheet to slide through the clamping means provided a sufficient pulling force is exerted on the sheet 11. By rotating the mould 13 by means of the handle 14, the pulling force exerted thereby on the sheet 11 overcomes the frictional resistance. In this way, the sheet 11 is tensioned so as to assist in the moulding thereof about the mould surface 23.

To form the arcuate portion, i.e. either a bull noze or a barrel vault, the mould 13 is rotated by way of the handle 14 and the heated sheet 11 takes the form of the mould surface 23. This is preferably done in the absence of heat and in the presence of air cooling. In this manner a smooth finish is allowed to form on the sheet.

It should be appreciated that the length of the arcuate portion, plus at least 200 mm is usually required for the ultimate length of the sheet 11.

Different shapes and sizes of formed sheet 11 can be achieved by increasing or decreasing the number of heating elements used in the heating chamber, and by using different moulds 13.

The foregoing describes only one embodiment, and modifications obvious to those skilled in the art, can be made thereto without departing from the scope of the present invention. For example, the dimensions used are for a twin walled polycarbonate sheeting, commonly known as Danpalon (registered trade mark), and any other materials used therein with similar properties may require a different length etc. Also, wherein the means by rotating the mould has been disclosed as a handle mounted on the side of the mould, a fully automatic means can also be utilized.

The mould can also be corrugated in order to form a corrugated sheeting as commonly used in roofing.

What I claim is:

1. An apparatus for moulding a polycarbonate sheet into a generally arcuate configuration, comprising a heating chamber, guide means to hold the sheet in a predetermined position spaced from a mould member having a predetermined arcuate mould surface and being pivotably mounted in said chamber, further comprising locating means to bring said sheet into contact with a leading portion of said mould member and means to rotate said mould in a predetermined direction.

2. The apparatus of claim 1 wherein said locating means secures said leading edge of said sheet to said mould member.

3. The apparatus of claim 2, wherein said mould member comprises a metallic outer shell filled with a polyurethane foam material.

4. The apparatus of claim 3 wherein said outer shell is manufactured from stainless steel.

5. The apparatus of any one of claim 3 wherein said heating chamber comprises a plurality of heating elements located above or to each side of said sheet.

6. The apparatus of any one of claim 5 wherein said apparatus further comprises a friction clamping means to exert a predetermined friction force on said sheet at a position spaced from said mould member.

7. The apparatus of claim 6 wherein said friction clamping means comprises a support member, and an engaging member detachably mounted to said support member, said support member and said engaging member having a nylon material disposed so as to selectively engage the sheet when interposed therebetween.

8. An apparatus for shaping plastic sheets comprising:
a heating chamber having an opening for the insertion of a plastic sheet;
a mould, pivotally and removably mounted within the heating chamber, the mould having an arcuate outer surface, the outer surface supporting a clamp for gripping a plastic sheet along a leading edge of the sheet, the clamp alignable with the opening;
the heating chamber having one or more heating elements located above the mould and also comprising a tensioner, the tensioner extending along at least a portion of the opening and adapted to frictionally resist a plastic sheet passing through the opening.

9. The apparatus of claim 8, wherein the mould surface is stainless steel.

10. The apparatus of claim 8, wherein the mould further comprises a handle for pivoting the mould.

11. The apparatus of claim 8, wherein the mould is filled with an insulating material.

12. The mould of claim 8, wherein the heating elements have longitudinal axes which are parallel with a pivotal axis of the mould.

13. The apparatus of claim 8, wherein the tensioner further comprises a clamp having clamping surfaces which are made from a nylon material.

14. The apparatus of claim 8, wherein the mould is corrugated.

15. An apparatus as claimed in claim 8, further comprising means for progressively rotating said mould from a first position within the chamber to a second position outside the chamber whereby, upon rotating said mould with said means, a sheet gripped in said clamp may be caused progressively to pass under said heating element or elements from said chamber.

16. An apparatus as claimed in claim 15, wherein the mould is filled with an insulating material.

* * * * *